UNITED STATES PATENT OFFICE.

WILLIAM N. BLAKEMAN, JR., OF MOUNT VERNON, NEW YORK.

PROCESS OF IMPARTING DRYING PROPERTIES TO FATTY OILS.

SPECIFICATION forming part of Letters Patent No. 496,987, dated May 9, 1893.

Application filed December 2, 1892. Serial No. 453,884. (No specimens.)

*To all whom it may concern:*

Be it known that I, WILLIAM N. BLAKEMAN, Jr., of Mount Vernon, in the county of Westchester and State of New York, have invented a new and useful Process of Imparting Drying Properties to Fatty Oils, which invention is fully set forth in the following specification.

The object of this invention is practically to convert "fatty" or non-drying oils, into drying oils, at least for many purposes and especially for use in the manufacture of "ready mixed paints."

The invention will first be described in detail and then particularly set forth in the claims.

It is well known that oils of either animal or vegetable origin, absorb oxygen when exposed to the air, exhibit an acid reaction, and in the case of the drying oils harden and pass to the state of a resin; and in the case of the non-drying or "fatty" oils, the oils thicken and assume a very gummy or sticky character. In my process I render the fatty oils capable of absorbing carbonic acid from the atmosphere and thus said oils are caused to dry when used as pigment-vehicles.

In carrying out my process I first impart to the oil selected an alkaline or basic reaction; and second I incorporate with the oil thus exhibiting an alkaline or basic reaction, a chemical agent having an affinity for the oil such as either the metallic oxides or salts; and third I add a chemical agent having an affinity for carbonic acid. If the several agents respectively employed in each step of the process, shall have, in addition to the functions above described, the power also of absorbing carbonic acid each successive step in the process will be cumulative in the absorption of carbonic acid; and thus the siccative action of the oil will be greatly promoted and accelerated. Having preferably selected cotton-seed oil to be thus treated, I dissolve in it a metallic soap, preferably a metallic soap, capable of absorbing carbonic acid, such as alumina soap; I then add basic acetate of lead, preferably the tri-basic, as the latter has an affinity for the oil and also for carbonic acid, and may also be used as a pigment in a subsequent reaction with carbonic acid. After a thorough incorporation of the foregoing elements I add thereto borate of magnesia, which also has an affinity for carbonic acid. This salt must also be thoroughly incorporated with the other elements named. Into the oil thus treated pigments may then be introduced as desired for the manufacture of ready mixed paints, or the oil may be allowed to rest for a few hours, when it may be drawn off, from any precipitates, for use in bulk.

While not confining myself to fixed proportions in this process, as the oils which may be treated, vary in density, requiring varying proportions, yet good practice dictates the use of about five to eight per cent. solution of the metallic soap, twenty parts of oil made to exhibit an alkaline or basic reaction, twenty parts of basic acetate lead, three parts of borate of magnesia, and twenty to thirty parts of the desired pigment. These proportions will make a ready-mixed paint which will dry satisfactorily in a few hours. A small percentage of a drying oil may be added to advantage at any stage of the process, if desired. Neither do I confine myself in the process to exactly the successive steps above named, for although I have named the steps giving satisfactory and decided results, yet the making of carbonic acid an agent in the drying of oils being, I believe, entirely new with me, some variation in combination and manipulation might be suggested to the scientific mind to bring about the desired end; and while the object of my invention is to effect the absorption of free carbonic acid, I do not insist that this is the total of the operation effected, for it may be possible that, as the results are so positive, the influence of some chemical agency or reaction may be exercised, in the process, which is not now apparent, though possibly yet discoverable.

As the acetates of lead give alkaline or basic reactions, basic acetate of lead may be substituted for the metallic soap in the first step of the process. But as a solution is the most intimate of all mixtures, the place of said soap in the process is one of great advantage as it has an affinity for carbonic acid.

All of the steps of this process may be carried on at ordinary temperatures, but heat may be applied to hasten any of the reactions, without departing from my invention. Any of the oxygen-carriers may be added to the oil in process of treatment, at pleasure, in the many forms of commercial "driers" now in use. If desired also, carbonic acid may be charged through the oil at any stage of the process of treating the oil.

Having thus fully described my invention, I claim—

1. The hereinbefore described process of imparting drying properties to fatty oils, which consists in combining in chemical union with such oils, an absorbent or absorbents of carbonic acid, and then exposing the oil so treated to the presence of carbonic acid, whereby the oil is rapidly dried, substantially as set forth.

2. The process of imparting drying properties to fatty oils, consisting in first adding to such oils a re-agent basic to carbonic acid, and then combining with the oil so treated a carbonic-acid-absorbent or absorbents, substantially as set forth.

3. The process of imparting drying properties to fatty oils, consisting in first adding an agent to impart an alkaline reaction to such oils, and then combining with the oil so treated a carbonic-acid-absorbent or absorbents, substantially as set forth.

4. The process of imparting drying properties to fatty oils consisting in incorporating with the oil, preferably cotton seed-oil a metallic soap having an affinity for carbonic acid, (preferably alumina soap) then adding a salt or salts having an affinity both for the oil and for carbonic acid, (such as, preferably, basic acetate of lead) and then adding a salt capable of absorbing carbonic acid, such as borate of magnesia, or other carbonic acid absorbent salt, the whole combined, with or without the agency of heat, substantially as set forth.

5. The process of imparting drying properties to fatty oils, consisting in incorporating with a fatty oil, preferably cotton-seed-oil, a metallic soap, preferably alumina soap, then adding a salt having an affinity both for the oil and for carbonic acid, such as, preferably, basic acetate of lead, then adding a salt capable of absorbing carbonic acid, such as borate of magnesia or other carbonic acid-absorbent salt, and then subjecting said mixture, or each aggregate of its ingredients, to a discharge of carbonic acid therethrough, substantially as set forth.

WM. N. BLAKEMAN, JR.

Witnesses:
FRANCIS P. REILLY,
JAMES F. COURT.